Sept. 13, 1960 R. M. TALLEY 2,952,779
MISSILE GYRO ALIGNMENT SYSTEM
Filed Oct. 29, 1958 2 Sheets-Sheet 1
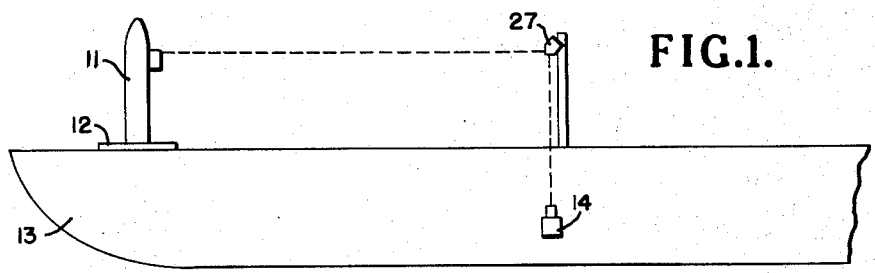
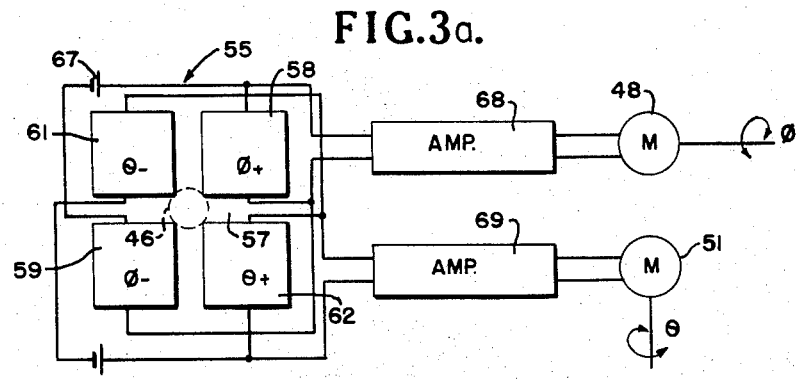
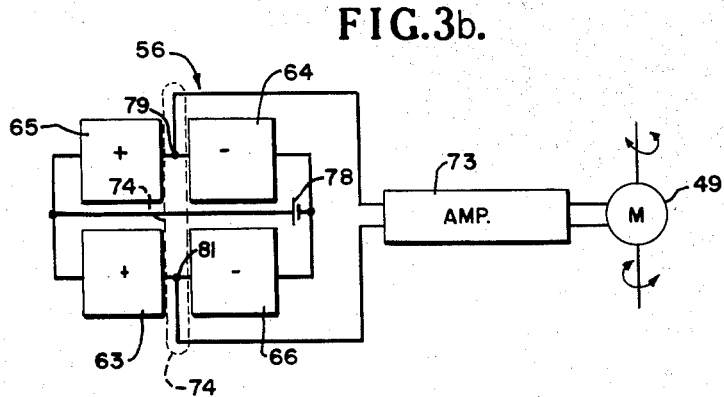
INVENTOR
ROBERT M. TALLEY
BY
ATTORNEYS.

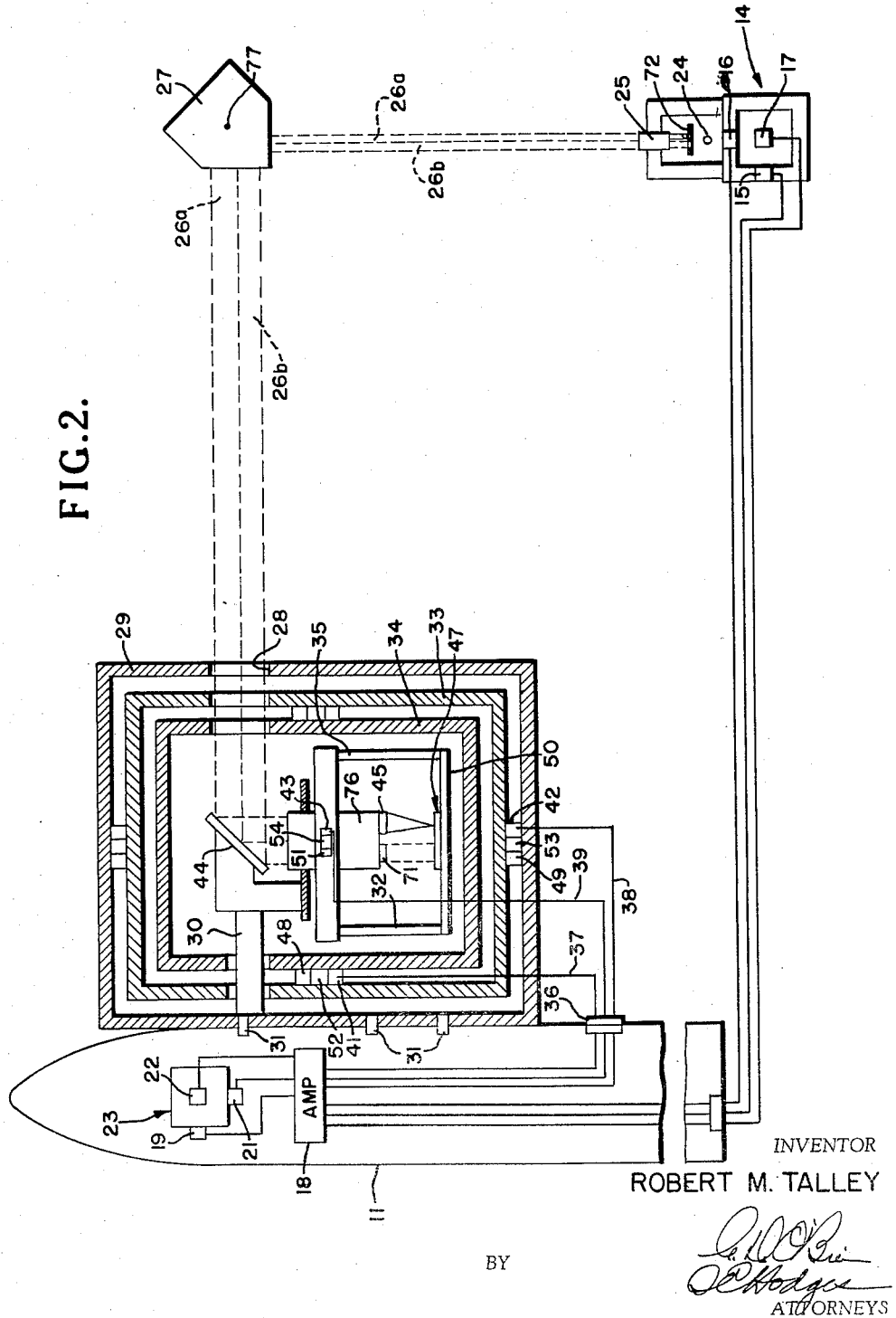

United States Patent Office 2,952,779
Patented Sept. 13, 1960

2,952,779
MISSILE GYRO ALIGNMENT SYSTEM

Robert M. Talley, Santa Barbara, Calif., assignor to the United States of America as represented by the Secretary of the Navy Filed Oct. 29, 1958, Ser. No. 770,567

6 Claims. (Cl. 250—209)

(Granted under Title 35, U.S. Code (1952), sec. 266)

The invention described herein may be manufactured and used by or for the Government of the United States of Amereica for governmental purposes without the payment of any royalties thereon or therefor.

This application relates to a new and improved electro-optical system for aligning the gyro of a missile guidance system with the master gyro on a missile launching ship.

In order to supply target information to the internal guidance system of a missile prior to launching, the gyros of the missile must be warmed up and aligned with respect to some reference device. Aboard ship a convenient reference is the ship's gyro compass; in a moving vessel, this mode of alignment results in certain problems arising from the fact that the ship's gyro is not fixed in space due to the ship's motion. The gross alignment of the missile is accomplished by positioning the missile gyro relative to the ship's gyro, neglecting flexibility of the ship. A servo system including standard synchro transmitters at the ship's gyro and synchro receivers at the missile gyro is generally employed for the purpose.

Unfortunately, the ship may not be strictly considered as a rigid structure; large vessels bend perceptibly as they move through the water. The bending tends to introduce errors in alignment of the missile gyro with respect to the ship's gyro since the conventional alignment systems are not able to correct for it. The error in alignment caused by non-rigidity of the ship may be treated separately as a small perturbation in the gross alignment.

Accordingly, the primary object of this invention is to provide an electro-optical gyro alignment system to supplement the usual shipboard synchro alignment system to correct small errors in missile gyro alignment caused by non-rigidity of the ship.

Another object is the provision of a new and improved electro-optical system for alignment of a missile gyro with respect to a remote master gyro by use of a collimated light beam.

Still another object is to provide an optical shipboard missile gyro aligning system which does not necessarily entail cutting windows in the missile skin.

These and many other objects will become more readily apparent when the following specification is read in the light of the attendant drawings wherein like numerals designate like or similar parts throughout the several views and in which:

Fig. 1 is a schematic representation of a ship carrying a missile in the "launch" position and utilizing an alignment system embodying the principles of this invention;

Fig. 2 shows in greater detail the electro-optical system of this invention, the relative sizes of the various parts being distorted in order to more clearly indicate the essential features thereof;

Fig. 3a is a plan view of one sub array of the photoelectric array of Fig. 2 showing the attendant circuitry; and Fig. 3b is a plan view of another sub array.

In this specification, the terms "missile gyro" and "ship's gyro" refer to gyro systems capable of detecting errors in pitch, roll and azimuth, it being understood that the "missile gyro" and "ship's gyro" includes two or more gyroscopes in accordance with conventional practice.

Mathematically, the problem of aligning the missile gyro with the ship's gyro resolves itself into two problems: [1] making two planes parallel [roll and pitch correction], [2] making a line in one plane parallel to a line in the other [azimuth correction]. Precise alignment of the missile gyro with the ship's gyro is accomplished by a conventional electrical system used in conjunction with a novel electro-optical system.

Referring now to Fig. 1, a missile 11 rests upon a launching pad 12 fixed to the deck of a ship 13. A ship's gyro 14 having a plurality of pickoffs such as synchro transmitters 15, 16 and 17 [Fig. 2] produces electrical signals proportional to the ship's motion in roll, azimuth and pitch. Error signals from transmitters 15, 16, 17 are fed to an amplifier unit 18 and then to synchro receivers 19, 21 and 22 respectively thereby to adjust the alignment of missile gyro 23 to correspond to that of the ship's gyro 14.

The foregoing missile alignment system is conventional. However it cannot exactly align missile gyro 23 because of the aforementioned flexibility of the ship's structure. The fine adjustment of the missile gyro alignment which compensates for the flexibility of the ship is provided by an electro-optical system.

A light source 24 such, for example, as a hot tungsten filament and a mask 72 having a slit and a circular aperture therein provide two light beams 26a and 26b. A collimator 25 fixed to the framework of the ship's gyro 14 collimates these light beams 26a and 26b. A prism 27 fixed to the superstructure of the vessel receives light beams 26a and 26b and diverts it 90° toward missile 11. Non-rigidity of ship 13 does not tend to misalign prism 27 with respect to ship's gyro 14 because the gyro and the prism are located relatively close to the vertical centerline of the ship; maneuvering the ship through the water does not induce bending moments of any consequence along its vertical centerline. Furthermore, rotation of prism 27 about axis 77 does not deviate the light beams from their intended 90° deflection path.

The ligh refracted from prism 27 passes through a window 28 in a housing 29 plugged into the missile 11 by accurately positioned pins 31 which locate housing 29 exactly with respect to the missile gyro 23 when the pins are snapped into place.

As indicated in Fig. 2 housing 29 is fixed to the missile and carries within itself an inner housing 32 mounted on gimbal rings 33, 34 and 35 so that it is free to move with respect to the outer housing 29. A pull out electrical connector 36 in missile 11 receives a plurality of leads 37, 38 and 39 from the gimbal pickoff units 41, 42 and 43 to introduce the signals produced by these pickoff units to synchro receivers 19, 21 and 22 respectively at the missile gyro unit to correct minor misalignments of missile gyro 23.

A plane mirror 44 is fixed to outer housing 29 by bracket 30 and directs the horizontal beam 26a downwardly through a tube 76 fixed with respect to the mirror and having a converging lens 45 mounted thereon to form a light image 46 [Fig. 3a] onto a photoelectric detector array 47 supported by platform 50 formed in housing 32. If missile 11 and attached housing 29 are moved with respect to ship's gyro 14 due to flexure of the ship, array 47 generates a signal of the proper polarity and feeds it to servo motors 48, 49 and 51 thereby moving the inner housing about the gimbal pivot points 52, 53 and 54 to realign inner housing 32 with respect to the ship's gyro 14. As the inner housing moves with respect to housing 29, pickoffs 41, 42 and 43 at pivot points 52, 53 and 54 generate error voltages which are fed into amplifier 18 in the missile 11 to move missile gyro 23 about appropriate axes to realign the missile gyro with respect to the ship's gyro.

Referring now to Figs. 3a and 3b, it can be seen that the detector array indicated at 47 in Fig. 2 is composed of two separate sub arrays 55 and 56 containing photodetector cells 58, 59, 61, 62 and 63, 64, 65, 66 respectively. The cells in sub array 55 are arranged to provide an inert cruciform space 57 therebetween. A lens 45 [Fig. 2] focuses an image 46 of light beam 26a onto the center or null position of this decussated inert space 57 so that when the image 46 does not impinge on any of the photoelectric cells or impinges equally upon each as is the case when missile gyro and the ship's gyro are aligned no signal is produced by sub array 55. Cell 58 is biased positively by a battery 67 and cell 59 is biased negatively by battery 67 so that amplifier 68 receives a positive input signal when the output of cell 58 predominates over that of cell 59. That is to say, when the image 46 of the light beam is shifted, due to flexure of the ship and one of the cells 58 and 59 receives more light than the other, amplifier 68 receives a signal of appropriate polarity to operate servo motor 48 turning the inner housing 32 in the proper direction about gimbal pivots 52 to restore light image 46 to the null position. The cells 61 and 62 in combination with amplifier 69 and motor 51 act in a similar manner to provide corrections in pitch. Pickoffs 41 and 43 respectively generate signals in response to movement about pivot axes 52 and 54 to actuate the missile gyro servo motors 19 and 22 thereby restoring the proper alignment of the missile gyro with respect to the ship's gyro.

The second detector sub array 56 corrects for errors in azimuth. In actual practice, sub array 56 may be physically located in a separate housing or in housing 29 as shown in Fig. 2. In the latter event, the beam 26b produces a line image on sub array 56. Instead of passing through lens 45 this portion of the beam is passed through a lens 71 to produce a line image 74 [Fig. 3b] on the inert space between the photocells of sub array 56. Battery 78 biases the cells so that cells 63, 65 and 64, 66 respectively are of like polarity. Thus, array 56 is very much like a bridge circuit. If image 74 moves to the left and the array comprises photoconductive elements, for example, the resistance of elements 63 and 65 will be decreased a like amount, resulting in equal voltage drops across each and therefore zero input to amplifier 73. However, if light beam 74 is rotated so that it alights on cells 65 and 66 the voltage across each of these cells will be less than that across 63 and 64. This results in an unbalance across the opposite points 79, 81 which are connected to the amplifier. It is thus seen that movement of image 74 in a direction vertically or horizontally as seen in Fig. 3b does not produce a detectable output signal while rotation of line image 74 about any point produces a negative or positive signal depending upon the sense of rotation. The output from the sub array 56 is fed to amplifier 73 to operate servo motor 49 and rotate inner housing 32 about the gimbal 53 to move the image 74 back to the null position. In response to this rotation about gimbal 53 pick off 42 generates a signal to energize synchro receiver 21 in the missile gyro to correct the azimuth setting of the missile gyro to compensate for errors introduced by flexure of the ship.

Thus the electro-optical system operates in conjunction with the conventional synchro transmitter system at the ship's gyro to actuate the synchro receivers 19, 21 and 22 and align the missile gyro.

When the launching of a missile is imminent, the missile gyros are erected and aligned with the ship's gyro by the conventional servo system. The housing 29 is also plugged into the missile and precisely fastened thereto by locating pins 31. The leads from the housing are plugged into connector 36 so that the electro-optical system also applies further correction to the missile gyro alignment to align it about each of the pitch, roll and azimuth axes. When the missile gyro is warmed up and able to maintain its alignment in space, housing 29 and the associated leads are removed from the missile so that it may be launched on command. One housing may therefore be utilized to align several missiles and nothing in the optical alignment system is destroyed at launching.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A system for aligning a missile gyro with the gyro of a missile launching ship which comprises in combination, an electrical servo system for aligning the missile gyro with the ship's gyro in a manner which does not compensate for flexure of the ship, and an electro-optical system for correcting the alignment of the missile gyro to compensate for flexure of the launching ship including; a source of collimated light fixed to the frame of said ship's gyro, an apertured housing releasably secured to the exterior of the missile for movement therewith, light directing means fixed with respect to the missile gyro disposed within said housing, a gimballed support mounted in said housing and having three degrees of freedom of movement, an electric current producing array having a null area and mounted on said support for movement therewith, said light directing means projecting at least one light image from said source onto said array in such a manner that when the missile gyro is aligned with the ship's gyro the light image falls on the null area and the array produces no output current, when the missile gyro is misaligned with the ship's gyro the array produces a current correlative to the amount and direction of misalignment, a plurality of servo motors each operatively connected to said gimballed support for causing movement thereof about its gimbal axes and each electrically connected to a portion of said array to receive electrical impulses from said array thereby to move the support and to position the array so that the light from said light directing means falls upon the null area of said array, and means responsive to the movement of the gimballed support to operate the missile gyro proportionally to the movement of the support thereby to correct the alignment of the missile gyro with respect to the ship's gyro and compensate for flexure of the ship.

2. The system of claim 1 wherein said array comprises at least one sub array including a plurality of spaced apart photoelectric cells disposed in quadrature relation to provide a central inert space therebetween adapted to receive said light image in said null position, whereby movement of said light image from said null position produces an output signal from one of said photoelectric cells to operate said servo motors.

3. The system of claim 1 wherein said array comprises two sub arrays each having a plurality of spaced apart photoelectric cells disposed in quadrature relation to provide a central null space therebetween adapted to receive the light image and said light directing means includes a beam splitter to divide the light beam into a first and a second portion, slit means disposed in said first portion to normally direct a line image on the null space of said first sub array, lens means to focus a spot image on the null space of said second sub array, each of said sub arrays respectively being electrically connected to at least one of said servo motors to operate the appropriate servo motor in response to movement of either image from its null space.

4. A system for aligning a missile gyro with a remote master gyro comprising; a synchro transmitter and receiver system connecting the missile gyro and the master gyro for gross alignment of the missile gyro, an electro-optical system including a source of collimated light fixed to said master gyro, a light sensitive detector secured to the missile, means for directing the collimated light to said detector, said detector being responsive to deflection of the light resulting from misalignment of the master gyro and missile gyro, and means electrically connected to the detector and to the synchro receiver to correct the misalignment.

5. A system for aligning a missile gyro with a remote master gyro comprising; a synchro transmitter and receiver system connecting the missile gyro and the master gyro for gross alignment of the missile gyro, an electro-optical system including a source of collimated light fixed to said master gyro, a housing releasably secured to the missile and containing a light sensitive detector, means for directing the collimated light to said detector, said detector including a plurality of photoelectric cells each producing an electrical output correlative to the amount of light incident thereon, whereby the total output from said cells varies in response to deflection of the light resulting from misalignment of the master gyro and missile gyro, and means within said housing responsive to the output of said detector and connected to the synchro receiver to correct the misalignment.

6. The system of claim 3 wherein said collimated light source is located at the vertical center line of said launching ship.

References Cited in the file of this patent

UNITED STATES PATENTS

| | | |
|---|---|---|
| 2,155,402 | Clark | Apr. 25, 1939 |
| 2,377,589 | Sutcliffe | June 5, 1945 |
| 2,418,137 | Noell | Apr. 1, 1947 |
| 2,446,316 | Willis | Aug. 3, 1948 |
| 2,678,401 | Jaeger | May 11, 1954 |